No. 641,735. Patented Jan. 23, 1900.
H. W. THEIS.
TIRE FOR VEHICLE WHEELS.
(Application filed Apr. 19, 1899.)

(No Model.)

Witnesses:
Geo. W. Franz
B. C. Roloff

Inventor
Henry W. Theis.
By H. G. Underwood
C. Worwerg

UNITED STATES PATENT OFFICE.

HENRY W. THEIS, OF MILWAUKEE, WISCONSIN, ASSIGNOR OF TWO-THIRDS TO GUSTAV PODOLL AND GUSTAV H. GOTTSCHALK, OF SAME PLACE.

TIRE FOR VEHICLE-WHEELS.

SPECIFICATION forming part of Letters Patent No. 641,735, dated January 23, 1900.

Application filed April 19, 1899. Serial No. 713,540. (No model.)

*To all whom it may concern:*

Be it known that I, HENRY W. THEIS, a citizen of the United States, and a resident of Milwaukee, in the county of Milwaukee and State of Wisconsin, have invented certain new and useful Improvements in Tires for Vehicle-Wheels; and I do hereby declare that the following is a full, clear, and exact description thereof.

My invention has especial reference to tires for bicycle-wheels, but is applicable to the wheels of other vehicles; and it consists in certain peculiarities of construction and combination of parts, as will be fully set forth hereinafter and subsequently claimed.

Figure 1:
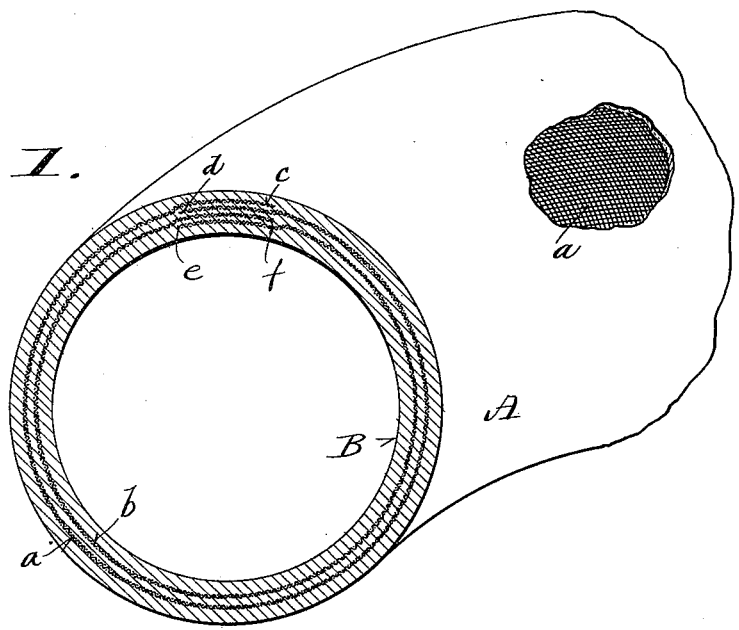
Figure 2:
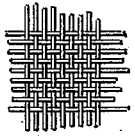
Figure 3:
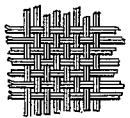

In the drawings, Figure 1 is a partly-perspective and partly-sectional view of a tire embodying my present invention. Figs. 2 and 3 are detail views illustrating preferred forms of the intermediate structure of said tire.

Referring to the drawings, A represents the outer tubular portion, and B the inner tubular portion, of a tire, said portions being formed of rubber or analogous material. Interposed between the said portions A and B are shown concentric layers $a$ $b$ of animal hair (from the tails and manes of horses) and woven together, as indicated in Figs. 2 and 3. The said concentric layers preferably overlap at their edges, as shown by the edges $c$ $d$ of the concentric layer $a$ and the edges $e$ $f$ of the concentric layer $b$, and this overlapping may be to any width desired, so that when this comes in line with what is called the "tread" of the tire it may serve, by reason of the increased thicknesses of the layers, as a guard against the puncture of the tire, besides thus making the tire strongest at this point of greatest wear. These layers $a$ $b$ greatly strengthen the tire without materially interfering with its elasticity or resiliency.

In the preferred form the hair is woven into a fabric, as shown in Figs. 2 and 3, and this may have either single warp and woof threads, as in Fig. 2, or double threads, as in Fig. 3, or a greater number of threads for either the warp or the woof, or both, as desired, in any instance. In the manufacture of the tire this woven-hair fabric is coated with a rubber solution and as many of the concentric layers employed as desired between the outer and inner tubular portions A B and then all vulcanized together.

It will be observed that the series of concentric layers of woven-hair fabric are everywhere separated from each other by the interposed coatings of rubber solutions, so that when all the parts of the tire are vulcanized together each layer of fabric is separated from the next one by a layer of rubber, and thus there is no contact of the layers of fabric, the described overlapping ends being also thus separated, all as clearly shown in Fig. 1.

Having thus described my invention, what I claim as new, and desire to secure by Letters Patent, is—

A tire for vehicle-wheels comprising an inner and outer tubular portion of rubber, with a series of interposed concentric layers of woven animal hair, having overlapping ends at the tread of the tire, each of said layers and its overlapping ends being everywhere free from contact with the adjacent layer and ends, and separated therefrom by continuous layers of rubber, and all vulcanized together, substantially as shown and described.

In testimony that I claim the foregoing I have hereunto set my hand, at Milwaukee, in the county of Milwaukee and State of Wisconsin, in the presence of two witnesses.

HENRY W. THEIS.

Witnesses:
H. G. UNDERWOOD,
B. C. ROLOFF.